April 28, 1925.

H. S. HELE-SHAW ET AL 1,535,308

CONTAINING VESSEL

Filed Oct. 14, 1921

Inventors-
Henry Selby Hele-Shaw
and Ernest Tribe
By B. Singer. Atty.

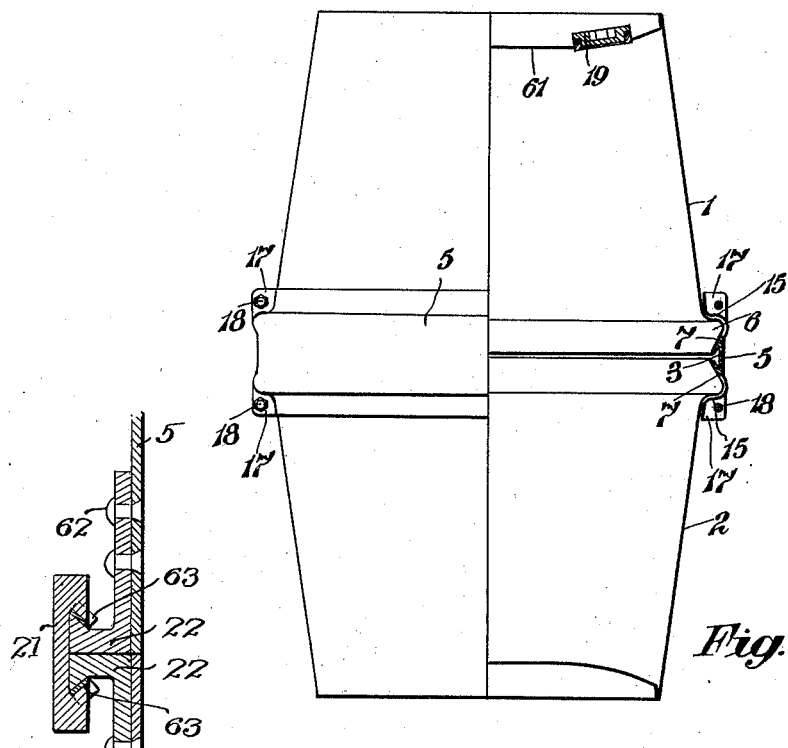
Fig.5.
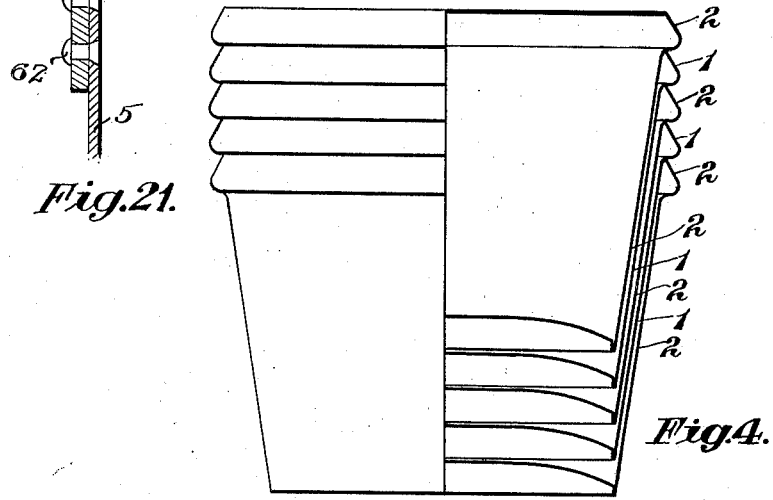
Fig.21.
Fig.4.

April 28, 1925.  
H. S. HELE-SHAW ET AL  
1,535,308  
CONTAINING VESSEL  
Filed Oct. 14, 1921  
5 Sheets-Sheet 3
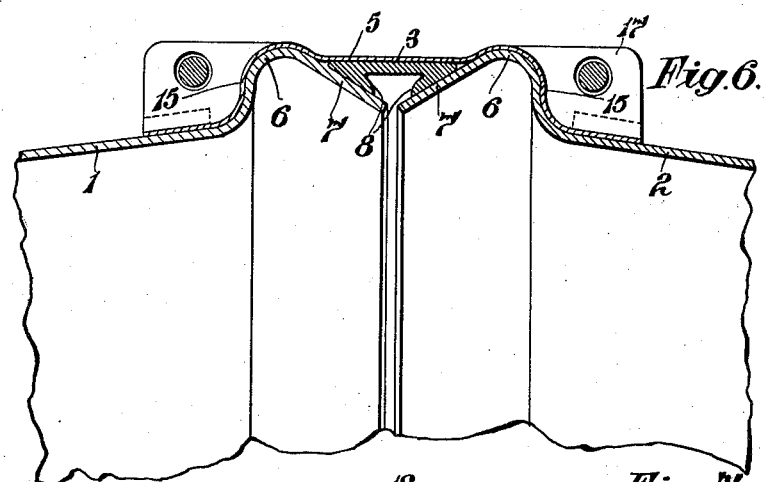
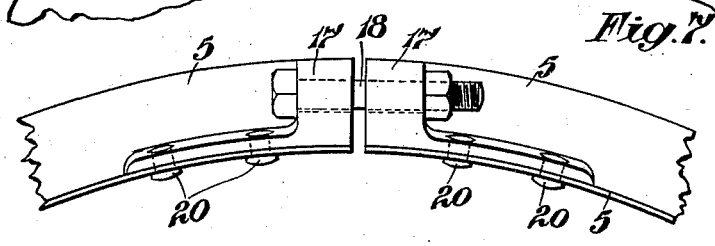
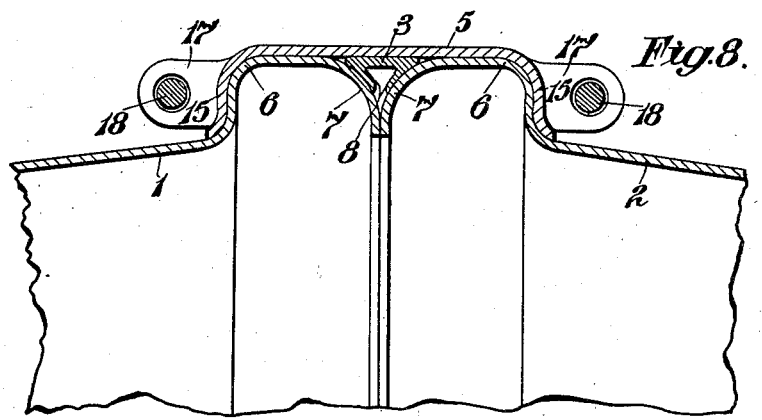

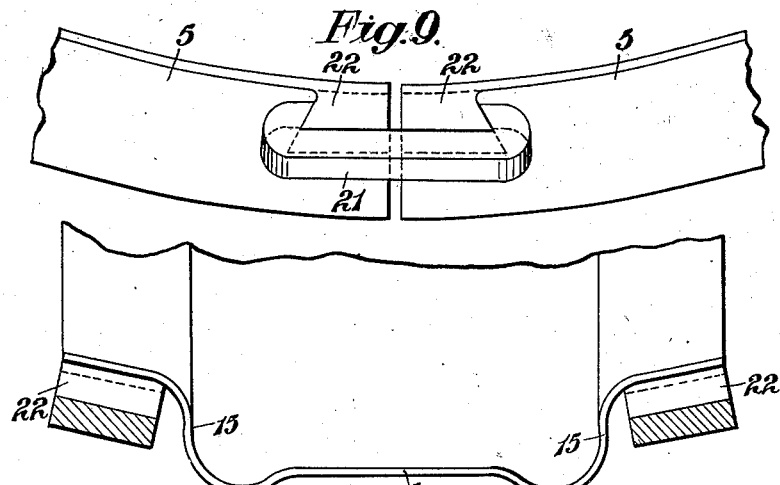
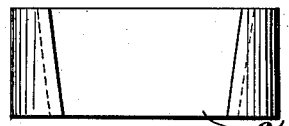
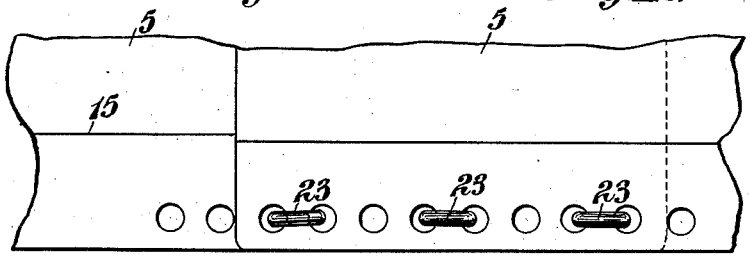
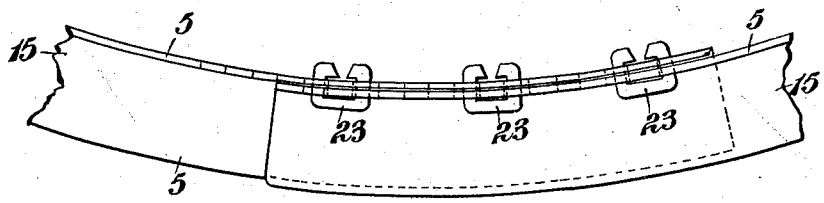

April 28, 1925.
H. S. HELE-SHAW ET AL
1,535,308
CONTAINING VESSEL
Filed Oct. 14, 1921
5 Sheets-Sheet 5
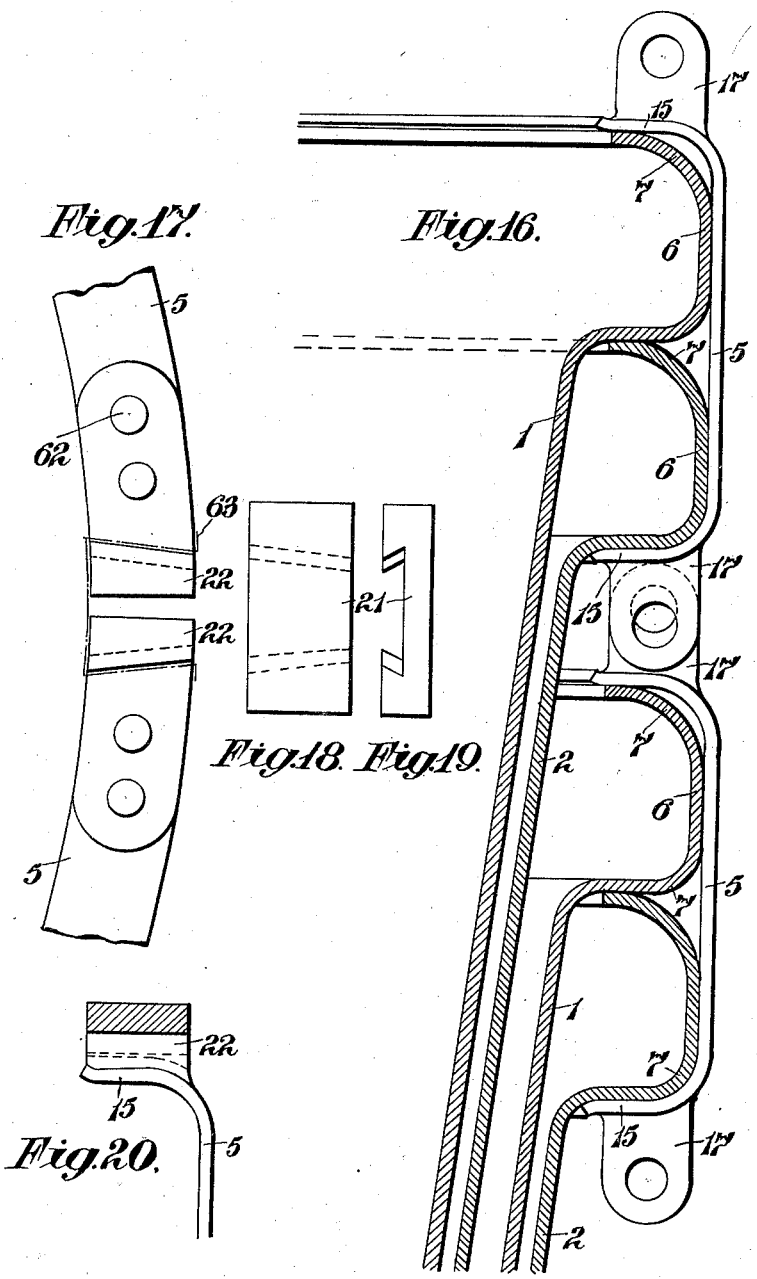
Inventors -
Henry Selby Hele-Shaw
and Ernest Trube
By B. Singer, Atty.

Patented Apr. 28, 1925.

1,535,308

UNITED STATES PATENT OFFICE.

HENRY SELBY HELE-SHAW AND ERNEST TRIBE, OF LONDON, ENGLAND; CHARLES TRIBE, EXECUTOR OR ADMINISTRATOR OF SAID ERNEST TRIBE, DECEASED, ASSIGNORS TO THE KENWARD COLLAPSIBLE (STEEL) BARREL COMPANY LIMITED, OF LONDON, ENGLAND.

CONTAINING VESSEL.

Application filed October 14, 1921. Serial No. 507,736.

*To all whom it may concern:*

Be it known that we, HENRY SELBY HELE-SHAW and ERNEST TRIBE, subjects of the King of Great Britain, and residents of London, England, have invented certain new and useful Improvements in Containing Vessels, of which the following is a specification.

This invention relates to containers consisting of two portions each closed at one end and open at the other so as to form elements adapted to be nested together. Such containers are usually provided with means for detachably connecting two of them together at their open ends.

The object of the invention is to provide a container of this type of simplified construction and of which the parts can be easily and quickly connected together and disconnected without the use of mechanically compressed packing, and at the same time when connected together will be thoroughly leak-proof.

According to the present invention the two halves or portions of the container are provided with connecting devices for holding them together co-axially with their open ends adjacent and their meeting edges or space between them covered by a hollow leakproof ring of flexible material having inturned edges inclined towards each other engaging corresponding edges on the respective halves of the container and adapted to be forced thereon by the fluid pressure within the container. The leaf-proof ring which may be provided with a housing or backing is of the kind described in the specification of British Patent No. 149381.

The two portions of the container are preferably of the same size and in the form of a frustrum of a cone so that they can be readily nested or placed one within the other when not in use or for transporting empty.

The two portions may be detachably connected together longitudinally by a rigid tie bar, tube, or a chain or other flexible but non-extensible member provided with devices for connecting its ends to the respective ends of the container. These devices for connecting the ends of the tie members to the ends of the container may be both or one of them adjustable from the outside of the container and provided with means for forming a fluid tight joint where they pass through the end or ends of the container.

Instead of connecting the two portions together by a longitudinal tie passing through the container they may be connected together at their open ends by a recessed or grooved band adapted to extend circumferentially round the container and cover the joint between the two portions and hold them together by engaging bead or flange like projections formed at or near their open ends. This band is divided at one or more places and provided with means for detachably connecting its ends or the ends of its divided portions together when in position on the two portions of the container.

Various embodiments of the invention are illustrated by the accompanying drawings wherein, Fig. 1 is a longitudinal section of a container in which the two portions are held together by a tie strut, Fig. 2 is a longitudinal section of a container in which the two portions are held together by a chain tie, Fig. 3 is a detail view of the fittings at the end of the chain tie, Fig. 4 is a partly sectional elevation of a number of the duplicate portions of the containers nested together, Fig. 5 is a partly sectional elevation of a container in which the two portions thereof are held together by a grooved or flanged band engaging beads or flange-like projections formed at or near the open ends of the two portions, Figs. 6 to 15 inclusive are detail views illustrating modifications of the method of connecting the two portions together by bands.

Fig. 16 is a fragmentary view illustrating a method of nesting in pairs the halves of a container having a band as in Fig. 8.

Figs. 17 to 20 are details of a modification of the band connection shown in Figs. 9 to 11.

Fig. 21 is a section through the band shown in Fig. 17.

In these drawings 1 and 2 are the two portions of the container, 3 the fluid-sealed leak-proof ring covering the joint between their open ends, 4 the tie member, and 5 the connecting band.

Figure 1:
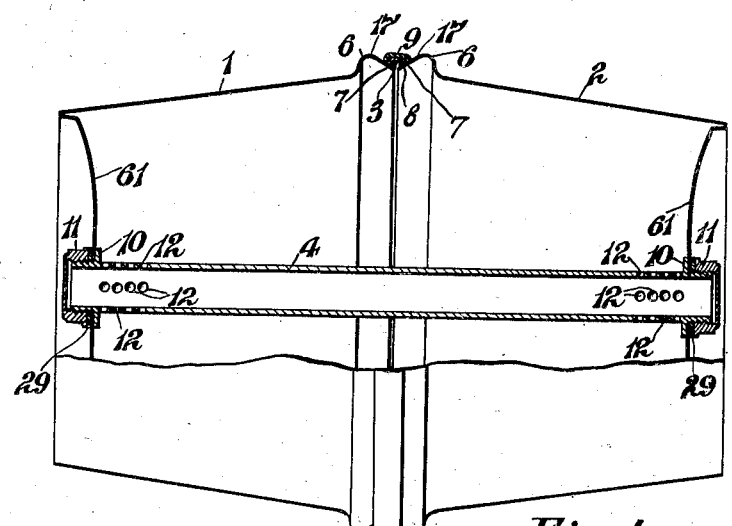

In an embodiment of the invention illustrated in Fig. 1 the two portions 1 and 2 are formed as dished members of sheet metal each having sides integral with their ends, which are dished for strengthening purposes and to contain the tie securing members. The open edges of each portion 1 and 2 are enlarged or beaded as shown at 6, and terminate in conical flange portions 7 adapted to receive the inturned edges 8 of a fluid-sealed leak-proof ring 3 of the kind described above provided with a housing 9. The outer diameter of this housing is smaller than that of the beaded portions 6 of the container so that the container can be rolled along the ground or a hard surface on these beads without affecting the fluid-sealed leak-proof ring 3. The tie strut member 4 as shown in this figure is in the form of a metal tube of less length than the container and extending through holes formed in the centres of the dished ends 61. On these ends are provided flanges 10, which form bearing members for the ends 61 thereby enabling the tube 4 to act as a strut member holding the main portions 1 and 2 of the container the desired distance apart. The flanges 10 may be substituted by nuts screwed on the tube. On the projecting ends of the tube 4 cap nuts 11 are screwed against the leather washers 29 adapted to form a fluid tight joint over the tie rod openings in the ends 61, the flanges 10 forming shoulders to enable a tight joint being made even when the container is made of the thinnest material. The tubes 4 are provided with a number of perforations 12, 12 near each end whereby the contents of the container can be discharged when the caps 11 are removed.

The fluid-sealed leak-proof ring or its housing can if desired, be attached to one of the portions of the container, and this ring with its housing not only serves to maintain an effective joint between the two portions of the container but stiffens the vessel so as to maintain the circular form thereof and preserve it from injury, thereby enabling the container to be made of thinner metal or material than would otherwise be the case.

In the above construction the flanges 10 hold the portions 1 and 2 of the containers the desired distance apart, so that a slight margin of clearance can be arranged between the adjacent edges of their open ends. This slight clearance not only allows for expansion and contraction, but also allows the whole screwing up force to come on the flanges 10.

The central tie column 4 may if desired, be solid and the emptying and filling of the container effected through a sealable opening placed eccentrically in the ends or at any other desired position on the container.

Figure 2:
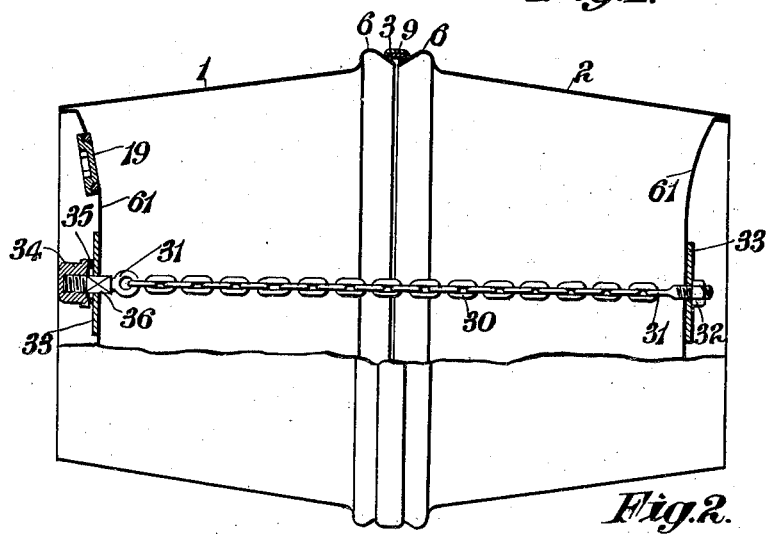
Figure 3:
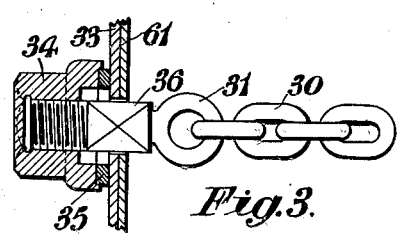
Figure 15:
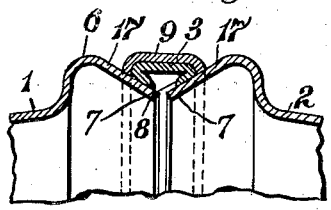

In the container showing in Fig. 2 the two portions 1 and 2 are connected together by a chain tie consisting of a chain 30 of which one end is connected by a ring bolt 31, nut 32, and washer 33 to the dished end 61 of the portion 2 of the container. The other end of the chain is adjustably connected to the dished end 61 of the portion 1 of the container by means of a ring bolt 31, washer 33, and cap-nut 34 bearing on a leather or like washer 35, shown in detail in Figure 3.

In order to prevent the chain 30 twisting during the screwing into place of the nut 34, the ring bolt 31 is provided with a squared portion 36 adapted to slide in a square hole in the end 6 of the container.

In Fig. 5 the open ends of the portions 1 and 2 are provided with beaded portions 6, and conical flange portions 7 as in Figure 1. The beads 6 form shoulders which are engaged by the flanged sides 15 of a grooved band 5 shown in detail in Figs. 6 and 7. The central portion of this band 5 forms a housing for the fluid-sealed leak-proof ring 3, and the band 5 is divided diametrically into two portions provided with flanges 17 whereby they can be connected together by bolts 18. The bands 5 are made of rolled metal and the bolting flanges 17 connected thereto by rivets 20 although in some cases the connection may be effected by welding. A filling and emptying screw plug 19 is provided in the end 61 of the container.

It will be readily understood that the two portions 1 and 2 of the container can be quickly assembled by placing their open ends together with the fluid-sealed leak-proof ring 3 in position on their conical portions 7, and after placing the two portions of the band 5 in position on the container fastening them together by the bolts 18.

In Fig. 8 is shown a modification of the band 5 and beaded ends of the portions 1 and 2 of the container.

In this modification instead of two grooves being formed in the band 5 as in Fig. 6 one groove only is formed having a flattened base and the beads 6 have corresponding flattened portions adapted to fit therein, the conical portions 7 are curved inwards and the inturned edges 8 of the fluid-sealed leak-proof ring 3 made to fit on them as shown.

One advantage of this construction is that the bands 5 can be bolted together on the two halves when nested, the fluid-sealed leakproof ring 3 being housed in the bottom of the first half. Thus a complete barrel and its accessories can be held together as a complete unit and the units nested one within the other, as shown in Fig. 16.

In the modification of the band 5 shown in Figs. 9 and 10 the ends thereof are drawn tightly together by means of a clamping member 21, having a tapered dove-tail groove adapted to fit on dovetail projections 22 secured to or welded on the ends of the band 5. These dovetail projections 22 are tapered correspondingly to the groove in the clamping member 24 shown separately at Fig. 11 so that when the latter is driven on them it draws the adjacent ends of the band 5 together so as to hold the two portions 1 and 2 of the container together.

A modification of this band connection is shown in Figs. 17 to 20 wherein Fig. 17 is a plan view of the two ends of the band 5 with the dovetail wedge members 22 riveted thereto, these dovetail wedge members 22 may, however, be welded to the ends of the band 5. Fig. 20 is an end view of the band 5, while Figures 18 and 19 are respectively a plan and an end view of the clamping member 21.

In the modification of the band 5 as shown in Figs. 13 and 14 the band is made of a single rolled grooved strip of metal with the ends overlapping each other. These ends are perforated near their outer edges for the reception of staple like rivets 23 shown in detail in Fig. 12. It will be readily understood that by placing the band 5 over the beads of the two portions 1 and 2 of the container and drawing its two ends over one another by a suitable tool and while in such position inserting the staple-like rivets 23 through registering holes in the overlapping ends, such ends can be secured by means of a suitable tool adapted to apply pressure on the staple rivets in such a manner as to cause their inner ends to bend towards each other as shown in Fig. 14. To facilitate this bending towards each other the legs of the rivets 23 are bevelled as shown in Fig. 12. In order to separate the two portions of the barrel a tool is inserted under the arched portion of the staple-like rivets so as to withdraw them and allow of the separation of the overlapping ends of the band 5.

Other means of joining the overlapping ends of the band may be employed, such as ordinary rivets, nuts and bolts, wiring, welding or soldering, or any suitable fastening.

What we claim and desire to secure by Letters Patent is:—

1. A container comprising two detachable portions each closed at one end and open at the other and held together by connecting devices coaxially with their open ends adjacent, inwardly inclined flanges on the open ends of the containers, and a non-mechanically compressed packing ring of flexible material of hollow cross section having a supporting housing at its external diameter and having its inner circumference formed of two free edges inclined correspondingly to the inturned flanges of the containers, the housing being arranged to hold the hollow packing ring within the space between the inwardly inclined adjacent flanges of the two portions of the container and within their outer diameter, and the inturned edges of the hollow ring held by fluid pressure against the outer faces of the adjacent flanges.

2. A sheet metal container comprising two detachable portions each closed at one end and open at the other, inwardly inclined flanges formed on the outer portions of hollow bead-like projections formed on the open ends of the two portions of the container, a disconnectable grooved band extending over the hollow bead-like projections of two adjacent containers, and a non-mechanically compressed packing ring of flexible material of hollow cross section having a supporting housing at its external diameter and having its inner circumference formed of two free-edges inclined correspondingly to the inturned flanges of the containers, the disconnected grooved band being arranged to engage and hold the beaded portions of the adjacent container together and to form the housing supporting the back of hollow packing ring while the free edges of the packing ring are forced by fluid pressure against the outer faces of the flanges on the open ends of the container portions.

3. A sheet metal container comprising two detachable portions each closed at one end and open at the other, inwardly inclined flanges formed on the outer portions of hollow bead-like projections formed on the open ends of the two portions of the container, a disconnectable grooved band extending over the hollow bead-like projections of two adjacent containers, and a non-mechanically compressed packing ring of flexible material of hollow cross section having a supporting housing at its external diameter and having its inner circumference formed of two free edges inclined correspondingly to the inturned flanges of the containers, the disconnected grooved band being formed of two divided portions of sheet metal detachably connected together and arranged to engage and hold the beaded portions of the adjacent container together and to form the housing supporting the back of hollow packing ring while the free edges of the packing ring are forced by fluid pressure against the outer faces of the flanges on the open ends of the container portions.

4. A sheet metal container comprising two detachable portions each closed at one end and open at the other, inwardly inclined flanges formed on the outer portions of hollow bead-like projections formed on the open ends of the two portions of the container, a disconnectable grooved band extending over the hollow bead-like projections of two adjacent containers, and a non-mechanically compressed packing ring of flexible material of hollow cross section having a supporting housing at its external diameter and having its inner circumference formed of two free edges inclined correspondingly to the inturned flanges of the containers, the disconnected grooved band being formed of two divided portions of sheet metal having at their meeting ends flanges connected by bolts and arranged within the outer diameter of the grooved band which is also arranged to engage and hold the beaded portions of the adjacent container together and to form the housing supporting the back of hollow packing ring while the free edges of the packing ring are forced by fluid pressure against the outer faces of the flanges on the open ends of the container portions.

5. A container comprising two detachable portions each closed at one end and open at the other and held together by connecting devices co-axially with their open ends adjacent, inwardly inclined conical flanges on the open ends of the containers, and a non-mechanically compressed packing ring of flexible material of hollow cross section having a supporting housing at its external diameter and having its inner circumference formed of two free edges inclined correspondingly to the inturned conical flanges of the containers, the housing being arranged to hold the hollow packing ring within the angular space between adjacent conical flanges of the two portions of the container and within their outer diameter, and the inturned edges of the hollow ring held by fluid pressure against the outer faces of the adjacent conical flanges.

6. A container comprising two detachable portions each closed at one end and open at the other and held together by connecting devices co-axially with their open ends adjacent, inwardly inclined flanges on the open ends of the containers, and a packing ring of flexible material of hollow cross section having a supporting housing at its external diameter and having its inner circumference formed of two free edges inclined correspondingly to the inturned flanges of the containers, the housing being arranged to hold the hollow packing ring within the space between the inwardly inclined adjacent flanges of the two portions of the container and within their outer diameter, and the inturned edges of the hollow ring held by fluid pressure against the outer faces of the adjacent flanges.

In witness whereof we affix our signatures.

HENRY SELBY HELE-SHAW.
ERNEST TRIBE.